United States Patent
Graf

(10) Patent No.: US 7,402,219 B2
(45) Date of Patent: Jul. 22, 2008

(54) METHOD AND DEVICE FOR THE PRODUCTION OF A MULTI-LAYERED THREE-DIMENSIONAL COMPONENT

(75) Inventor: Daniel Graf, Ditzingen (DE)

(73) Assignee: Trumpf Werzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/498,333

(22) PCT Filed: Dec. 9, 2002

(86) PCT No.: PCT/EP02/13916

§ 371 (c)(1),
(2), (4) Date: Apr. 2, 2005

(87) PCT Pub. No.: WO03/049926

PCT Pub. Date: Jun. 19, 2003

(65) Prior Publication Data

US 2005/0161146 A1 Jul. 28, 2005

(30) Foreign Application Priority Data

Dec. 11, 2001 (DE) .................. 101 60 772

(51) Int. Cl.
C03B 29/00 (2006.01)
B32B 37/12 (2006.01)
B32B 38/04 (2006.01)
B23K 31/02 (2006.01)

(52) U.S. Cl. .............. 156/89.11; 156/64; 156/89.23; 156/248; 156/267; 156/272.8; 156/281; 228/170; 700/118; 700/119

(58) Field of Classification Search .......... 156/89.11, 156/256, 263, 264, 267, 272.8; 700/118, 700/119; 228/170
See application file for complete search history.

(56) References Cited

U.S. PATENT DOCUMENTS

| | | | | |
|---|---|---|---|---|
| 627,332 | A * | 6/1899 | Florence et al. | 415/92 |
| 4,752,352 | A * | 6/1988 | Feygin | 216/33 |
| 5,071,503 | A * | 12/1991 | Berman | 156/250 |
| 5,637,175 | A * | 6/1997 | Feygin et al. | 156/264 |
| 5,730,817 | A * | 3/1998 | Feygin et al. | 156/64 |
| 5,779,833 | A * | 7/1998 | Cawley et al. | 156/89.11 |
| 6,024,003 | A * | 2/2000 | Newman et al. | 83/24 |
| 6,048,432 | A * | 4/2000 | Ecer | 156/263 |
| 6,056,843 | A * | 5/2000 | Morita et al. | 156/250 |
| 6,146,487 | A * | 11/2000 | Lee et al. | 156/268 |
| 6,450,393 | B1 * | 9/2002 | Doumanidis et al. | 228/110.1 |
| 6,484,776 | B1 * | 11/2002 | Meilunas et al. | 156/382 |
| 6,575,218 | B1 * | 6/2003 | Burns et al. | 156/512 |
| 6,627,030 | B2 * | 9/2003 | Yang et al. | 156/250 |

(Continued)

FOREIGN PATENT DOCUMENTS

JP 9-66565 * 3/1997

(Continued)

Primary Examiner—Melvin Mayes

(57) ABSTRACT

The invention relates to a method and a device (12, 13) for producing a multi-layered three-dimensional component (14). In a first step, a layered geometrical structure is formed, said structure consisting of at least two webs (16) of an at least high temperatures-resistant material. In a second step, an at least partly material connection is produced between the individual webs of the entire layered structure by means of at least one thermal treatment.

24 Claims, 4 Drawing Sheets

U.S. PATENT DOCUMENTS

| | | | |
|---|---|---|---|
| 6,627,835 B1 * | 9/2003 | Chung et al. | 219/69.12 |
| 6,672,502 B1 * | 1/2004 | Paul et al. | 228/164 |
| 2001/0040003 A1 * | 11/2001 | Yang et al. | 156/264 |
| 2003/0006001 A1 * | 1/2003 | Yang et al. | 156/250 |
| 2006/0054282 A1 * | 3/2006 | Yang et al. | 156/378 |
| 2006/0065355 A1 * | 3/2006 | Chiu et al. | 156/247 |

FOREIGN PATENT DOCUMENTS

| | | | |
|---|---|---|---|
| JP | 9-109269 | * | 4/1997 |

* cited by examiner

METHOD AND DEVICE FOR THE PRODUCTION OF A MULTI-LAYERED THREE-DIMENSIONAL COMPONENT

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

The invention relates to a method and a device for producing a three-dimensional component consisting of plural layers.

1. Field of the Invention

An LOM (Laminated Object Manufacturing) method has been developed for producing prototypes and small runs and also for rapid tool and component production; the technique depends on laminar building up of plural layers of material which have the body geometry of the body to be produced. In the production, the data of a CAD construction are accessed. These data are prepared for controlling corresponding equipment which is used in layer construction, and produce the respective geometry of the corresponding layer in order to form a three-dimensional component. The requirements on such a method are increased because of the requirement that thin layers with a thickness of, for example, 0.1-1.0 mm are to be processed to produce a component.

2. Description of Related Art

From U.S. Pat. No. 5,637,175 there is known an embodiment of a method for producing a laminar built up component, in which a layer of a plate-form material is fed to a processing station, in which numerous layers were first positioned and were connected together. The last layer fed is applied to these layers and welded to them. The geometry of the layer is brought about by a laser tool, whereby a region exists in the layer which is to be maintained for the component, and a further region which is to be removed as waste. In order to perform this work section, the laser is guided along the undesired regions in order to weaken or release the solder connection, so that the undesired regions can be removed.

From this publication there is furthermore known a process in which a first shape is first cut from a length of material, and is supplied by a conveyor belt to a second processing station. In this processing station, a stack with plural layers is positioned under pressure to the newly supplied layer. By rasterform scanning with a laser, a weakening of the solder layer is effected, so that the newly applied layer is soldered to the stack. At the same time, the undesired regions are cut by the laser, so that only the region for forming the three-dimensional component remains on the stack.

These methods have the disadvantage that, in order to remove the undesired regions, which are connected to the stack by a solder or weld connection, a high energy has to be applied by means of a laser in order to remove this solder or weld connection. The bordering regions are also affected by the high processing temperature, so that internal stresses are formed in the component formed by laminar construction. Furthermore, the high applied energy can also give rise to a partial release of the adjacent superposed layers. The quality of the component is thus impaired. In addition, there is a high processing cost, in which undesired regions, which are the first soldered or welded, have to be removed again by a further heating.

Furthermore, a process follows from this publication in which the layers to be built up are provided in a heated chamber. It is provided here that the temperature of the chamber is just below the melting point of the solder, in contrast to which a heating roller is provided for connecting the uppermost layer to the stack, supporting the soldering process. This method has the disadvantage that due to the high temperature, melting occurs of the solder layer lying directly beneath the two layer to be connected, resulting in a danger of relative displacement of the layers due to the heating roller rolling over them. Due to this, a precise construction of the component with high process reliability cannot be given.

In WO 99/02342, a method and a device for producing a component with a laminar construction from metal foils have furthermore been disclosed. In this method, a composite material is employed, in which the layer provided for the component is arranged on a carrier material. A low-melting solder layer is provided between the layer provided for the component. A higher-melting solder layer is applied to the side against the carrier material. This carrier material is fed to a first processing station. Here the contour in the layer is introduced, for example by means of a laser. In a following station, the composite material above the higher-melting solder layer is heated, and the baseplate carrying the stack is moved up and down. The layer is applied to the stack under pressure. By cooling of the high-melting solder, the layer to be applied remains on the stack. The low-melting solder still remains liquid, so that the newly applied layer is lifted from the carrier material.

This method requires the preparation of an expensive composite material and an exact positioning of the contour of the layer to be applied to the stack for producing the desired component geometry.

BRIEF SUMMARY OF THE INVENTION

The invention therefore has as its object to provide a method and a device which make possible in a simple manner a dimensionally accurate production and stress-free arrangement of the individual layers for laminar construction of a component starting from a CAD model.

This object is attained according to the invention by a method according to the invention.

The method according to the invention has the advantage that a component produced in a process step by laminar construction from at least two sheets of material is subjected in its totality to a second process step to a heat treatment, in order to form a material-bonded material connection between the individual layers of material. The finished component is thereby stress-free, and is made by means of the simultaneous heating and treatment of all the layers of material, giving a uniform connection extending over the individual layers. By means of this process step, the dimensional accuracy of the component built up in the first section is maintained, since the heat treatment acts uniformly on all the sheets of material of the laminar construction.

According to an advantageous embodiment of the invention, it is provided that the laminar construction is at least partially, preferably completely, surrounded by a powder in a heat treatment chamber. By placing the laminar construction in a powder bed, any optional geometry can be positioned in the chamber for heat treatment. Moreover, the geometry of the laminar construction is maintained during the heat treatment in the powder bed.

According to a further advantageous embodiment of the invention, it is provided that the chamber is heated in a heating-up phase to a temperature which is higher than an evaporation temperature of an adhesive provided between the individual layers. In the heating phase, the adhesive as an intermediate layer is thus driven out from the individual layers and evaporated, so that the laminar construction is prepared for a subsequent process for material connection by the material itself.

According to a further advantageous embodiment of the invention, the chamber is filled with a powder which is neutral to adhesive, to solder, and to welding means for layer construction. Adhesion or baking of the powder to the laminar structure during the heat treatment is thereby prevented. The power surrounding the component thus does not affect the component geometry.

The laminar structure is advantageously loaded with a pressure in the chamber. Thereby, on the one hand, compensation is made possible for the shrinkage process due to the expelled adhesive. On the other hand, the pressure required in the powder bed for the flat abutment of the layers to one another is maintained, in order to produce a uniform material-bonded connection between the individual material sheets. The powder bed, which also surrounds the laminar structure, has the advantage that during pressure loading from above, the surrounding regions remain constant in their geometry, so that the individual layers also remain positioned in the provided position without during the heat treatment, without a horizontal displacement relative to one another. A change of the constructional height of the laminar structure due to the expelled adhesive is compensated by the powder and does not affect the position of the individual layers.

According to a further advantageous embodiment of the invention, it is provided that the chamber is filled with a powder which cannot be soldered, cannot be welded, and can be sintered only with difficulty. The powder advantageously has a chemically neutral behavior to the component. After the heat treatment, it is made possible to release the three-dimensional article from the powder bed without problems. Preferably boron nitride powder, corundum powder, or graphite powder are provided.

The powder introduced into the chamber for connecting the laminar structure using material is, according to a preferred embodiment, a powder mixture composed of at least one base powder and at least one additional powder, the additional powder being vaporized in the heating-up phase of the heat treatment. In this way it can be ensured that the powder surrounding the laminar structure likewise undergoes an reduction in height like the laminar structure, and a pressure uniformly distributed over the surface of the laminar structure can be maintained.

Preferably a percentage fraction of the additional powder is mixed with the base powder and substantially corresponds to the percentage volume fraction of the adhesive placed between the individual sheets of material. The proportional reduction of the height of the laminar structure during the heating-up phase by evaporation of the adhesive corresponds to that of the powder mixture by evaporation of the additional powder, so that the exact positioning of the individual sheets of material of the laminar structure over one another is maintained.

For attaining proportional change in the height of the powder mixture arranged in the chamber in analogy to the laminar structure, preferably hydrocarbon compounds, particularly polymers, are admixed to the base powder. Preferred are polyolefins, polyacetates, polyacrylates or the like are used. The additional powder preferably has a particle size which corresponds to that of the base powder. Preferably a particle size of less than 1 mm is used. Sufficient interspaces for the sufficient evaporation of adhesive and additional powder are thereby created, and a reliable positioning of the individual sheets of material is attained for connection of the laminar structure by means of material.

In a preferred embodiment, a laminar structure is provided of a powder consisting of a base powder and a powder mixture consisting of at least one base powder and at least one powder mixture. Boron nitride, corundum or graphic powders are used, for example, as base powder, which is introduced in the region of a baseplate for the laminar structure. In a region bordering on the laminar structure, a powder mixture of at least one base powder and at least one additional powder is provided. Located thereabove, a powder mixture or a base powder can be provided. By the variable filling of the powder and the at least one powder mixture in the chamber, a flexible adaptation to the different height changes of the laminar structure in heat treatment for connecting by material can be given, in particular with a laminar structure which includes different thicknesses of the sheets of material or intermediate layers.

According to a further advantageous embodiment of the invention, it is provided that the heating-up phase is ended at a temperature located above the vaporization temperature of the adhesive, and that a solder provided between the sheets of material of the laminar structure is transformed into a liquid state. The heat treatment can thereby be concluded with a soldering process.

Alternatively, it is provided that with sheets of material which exclusively have an adhesive, the heating-up phase is ended at a temperature at which welding, particularly diffusion welding of the sheets of material, takes place. Completely metallic components can thereby be produced.

It is made possible by the method according to the invention, in particular in a first process section according to the invention, that by means of a reduction of the number of the number of working steps a more rapid laminar construction for a component geometry is made possible, which furthermore makes possible an exact construction.

In the first process step for producing the laminar structure of the three-dimensional component, of at least high temperature resistant sheets of material, it is advantageous to provide a layer of adhesive on at least one side of the length of material, which makes possible, after placing the uppermost length of material on the layer structure lying therebelow, at least a pre-fixing or a fixing. After this, the desired contour for the corresponding layer is introduced, preferably with a laser. The undesired regions are preferably removed by suction; for example regions which adhere to a layer lying below because of the adhesive are released by softening the adhesive by means of a laser beam. The adhesive layer is adjusted so that a slight warming of the undesired regions is already sufficient for abolishing the adhesive connection, so that the adjacent regions are practically unaffected.

By the advantageous design and arrangement of the adhesive, it can thus be arranged that in the first process step, on the one hand an exact positioning of the last applied layer on the layers lying below it is given, and that by abolishing the adhesion by slight heating, which is partially given, for example, by the action of a laser beam, no internal stresses are produced in the adjacent regions. A dimensionally accurate laminar structure can undergo, after its completion in a second processing step, a heat treatment for at least partial connection by material while maintaining dimensional accuracy.

The device according to the invention for producing a connection by material in a component consisting of a laminar structure, in particular for performing the second process step according to the method described hereinabove, has the advantage that a heat treatment of the laminar structure is made possible both with and without a baseplate. Moreover, a heat treatment can be carried out independently of the geometry of the component to be produced, and makes possible a connection by material between the individual layers.

It is advantageously provided that a cover of the device has a stamp which borders on the inner wall of the chamber. A uniform pressure can thereby act on the laminar structure, so that a uniform pressure between the individual layers is attained, even when there is a change of the constructional height of the component due to the expelled adhesive, insofar as this is provided on the sheets of material.

The device according to the invention for producing a laminar structure, particularly for performing the first process step according in the method described hereinabove, has the advantage that a more rapid and exact construction is possible in which the layers are pre-fixed or fixed and are arranged together, free from internal or thermal stresses. Further advantageous embodiments and developments of the method, in particular for performing the first process step, are given in detail in the further claims.

The powder consisting of a base powder, or a powder mixture consisting of at least a base powder and at least one additional powder, can likewise according to the invention also be used exclusively for a second process step in which an at least partial connection by material is produced by means of at least one heat treatment between the individual sheets of material of the whole laminar structure of a three-dimensional component. The laminar building-up of a three-dimensional component by performing the second process section can also be constructed differing from the first process step. The powder according to the invention and the powder mixture according to the invention can be used at least for performing the second process step. The described compositions and also properties of the powder and also powder mixture can be combined arbitrarily according to the invention and are not limited to the embodiments and purposes of use described in detail.

BRIEF DESCRIPTION OF THE SEVERAL VIEWS OF THE DRAWINGS

The production of a component according to the invention is described in detail hereinbelow using the accompanying drawings.

DETAILED DESCRIPTION OF THE INVENTION

Figure 1:
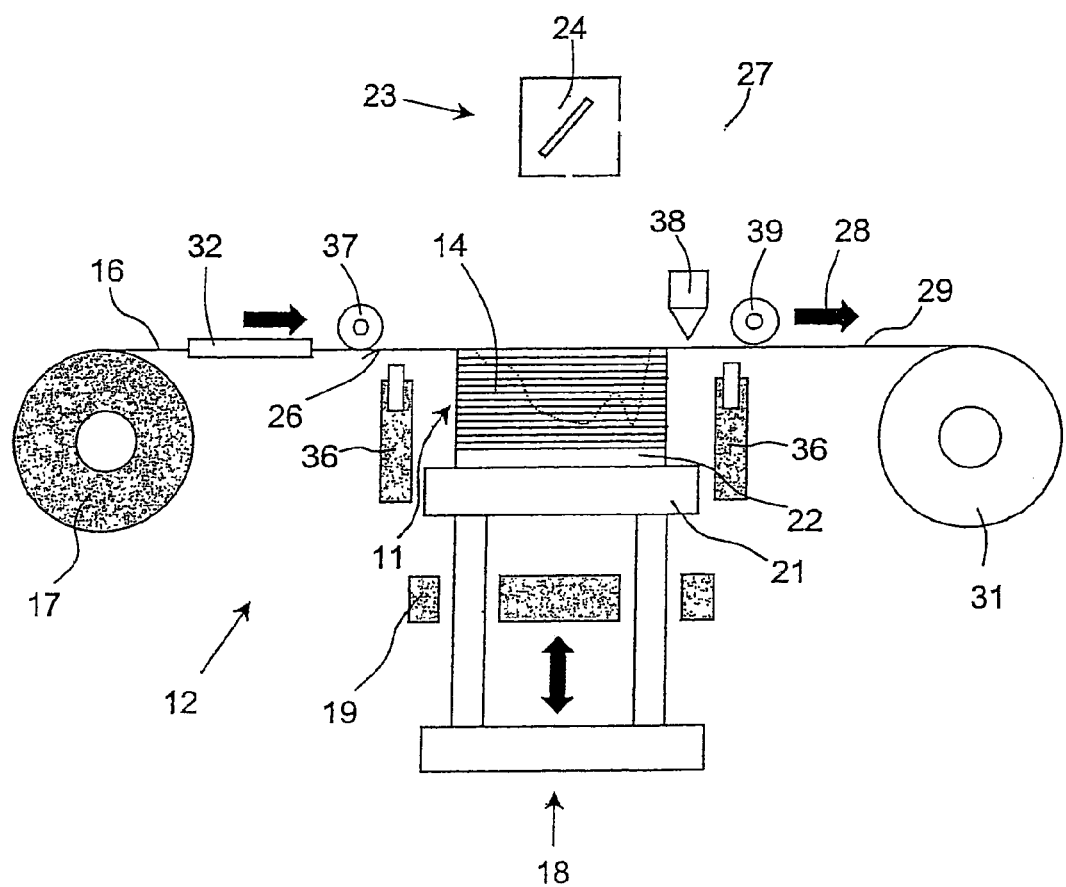
FIG. 1 shows a schematic diagram of an apparatus for producing a laminar structure in a first process step.
Figure 4A:
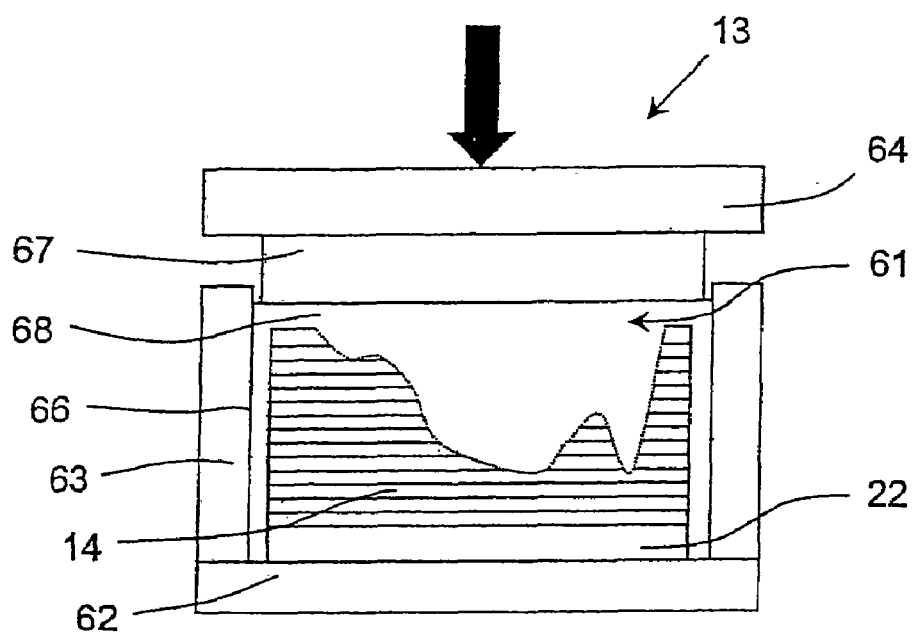
FIGS. 4a and 4b show schematic diagrams of the devices according to the invention for performing the second process step.
Figure 4B:
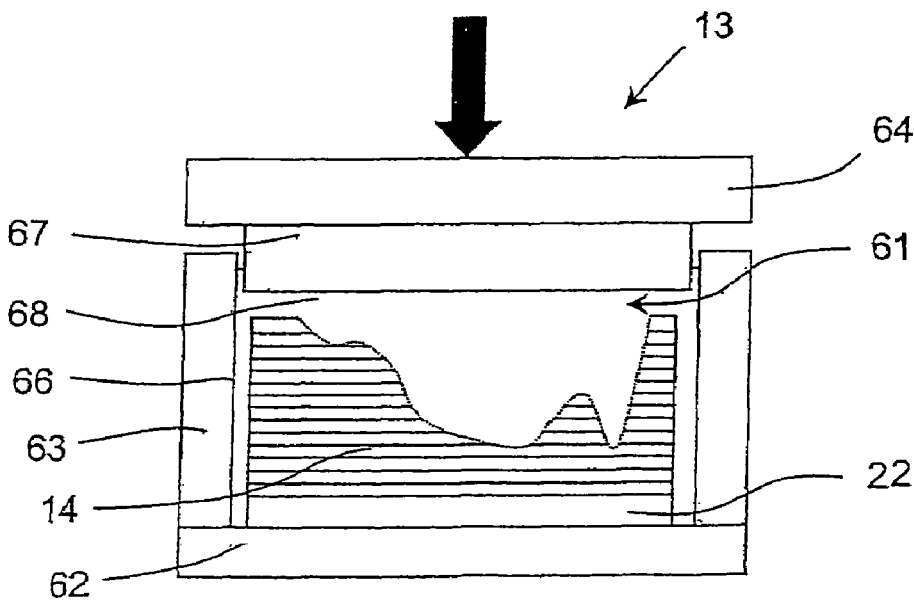

An apparatus 12 is shown in FIG. 1 for producing a component 11 consisting of plural layers, and for example makes it possible to perform the method according to a first process step. A device 13 which for example makes possible carrying out a second process step is shown in FIGS. 4a and 4b. The apparatus 12 and the device 13 are set up in series and can for example be connected together by a transport or handling system, which is not shown in detail. The production of a three-dimensional component based on a three-dimensional CAD model is made possible by the apparatus 12 and device 13. For example, prototypes or short runs can be produced thereby. The rapid production of individual workpieces can likewise be realized.

The apparatus 12 for performing the first process step is described hereinbelow.

A length of material 16 is used in the apparatus 12 for a laminar structure 14. The length of material 16 is drawn out by a roller 17 and fed to a processing station 18. The processing station 18 consists of a guide unit 19 with an elevating platform 21, on which a baseplate 22 is provided for the building up of individual layers. A processing unit 23 is provided above the baseplate 22, and consists for example of a laser from which a laser beam 27 is deflected by a scanner 24 onto the baseplate 22, in order to process a length of material 16 positioned on the baseplate 22. The laser beam 27 can likewise be deflected by further optics, which are arranged movably at least in an X-Y axis system. The length of material 16 supplied to the processing unit 23 has a layer of adhesive 25 on at least one side, preferably on its underside, so that the region of the length of material 16 introduced into the processing station 18 is adhered to the baseplate 22, if the first layer is concerned, or to a previously applied layer. A contour is introduced into at least the uppermost lengthy of material 16 by a laser beam 27. An exact cut gap between the remaining material and the undesired material or waste material can be produced by this laser engraving. This is described in detail hereinafter in FIGS. 3a-3c.

After the contour has been introduced into the length of material 16 by the layer beam 27, the elevating platform 21 is moved downward by an amount in the Z-direction. The length of material 16 is stepped further in the direction of the arrow 28, so that a length of waste material 29 is rolled up on a roller 31.

Instead of the preparation of the length of material 16 on rollers 17, a flat product can be provided. Individual flat items can be placed on a transport belt by manipulating systems, or supplied to the processing station 18, and taken out again or directly laid down.

The component 11 produced in the processing station 18 by a laminar structure 14, in which the superposed individual sheets of material 16 are adhered together, is termed a green part. The adhesive used is formed such that sufficient adhesive action between the individual sheets of material 16 is given in order to fix the mutually positioned sheets of material 16 in the exact position after, for example, a laser engraving. Furthermore, the adhesive is set such that the adhesive bond is weakened or abolished by a laser beam 27 at the places which fix to layer located thereunder the waste material or material to be removed.

The sheet of material 16 is preferably formed of a material which is resistant to high temperatures. In particular, metallic materials are provided as the sheet of material 16. Alternatively, ceramic materials can also be used. When the sheet of material 16 is formed as metal foil, for example layer thicknesses in the region of 0.05 mm through 2 mm are provided. The production accuracy of the component can be increased by the use of thin layers.

The laminar structure 1 produced in the processing station 18 does not correspond, seen in the Z-direction, to the actual height which is provided, since at least the adhesive is provided between the individual layers. In a subsequent second process step, the adhesive is expelled, so that the constructional measurement in the green part is reduced toward the final constructional measurement. In order to attain an exact constructional measurement after finishing the component, a layer thickness measuring device 32 is provided before the processing station 18, and determines the actual layer thickness of the supplied sheet of material 16 without adhesive layer. By addition of the individual determined layer thicknesses, a very exact component height can be determined for the finished component. The fluctuation of the layer thicknesses can also be determined thereby; it can amount of ±4%, and with numerous layers can be have appreciable effects. Layer thickness measurement can be performed on a sheet of material 16 which has no adhesive layer, or adhesive layer at least on one side; to the extent that it can be of advantage that no coating is present on the sheet of material 16, an adhesive application unit can be provided following the layer thickness measurement device 32. This adhesive application unit can for example be provided in the form of a wide slot nozzle for application of an adhesive, as a roller system, or as a spray system. Furthermore, specific to the application, the application of for example a solder or the like can be provided simultaneously to or following the adhesive application unit.

Insofar as the sheet of material 16 is prepared in rolls, and already provided with an adhesive layer on at least one side of the sheet of material, it can advantageously be provided that a separating layer is provided between the individual rolled-up sheets. This is taken off immediately before the layer thickness measurement device 32 by means of a roller arrangement, so that one the one hand easier unwinding of the sheet of material 16 prepared on the roll 17 is given, and a layer thickness measurement can be performed in addition thereto.

After supplying an unused section of the sheet of material 16 into the processing station 18, the elevating platform 21 is moved over to a working position. Simultaneously the new sheet of material 16 is brought into the processing station 18. The newly supplied sheet of material 16 is pressed by at least one presser roller 37 onto the layer located thereunder and adhered. Alternatively to the presser roller(s) 37, a presser plate can also be provided which is installed in the processing station 18 for the application of pressing force. The adhesion of the sheet of material in the processing station 18 can take place old or affected by temperature effect, for example, by heated rollers. After performing laser engraving, the raising cylinders 36 are positioned at the underside of the sheet of material and form a counter-bearing, so that on lowering the elevating platform 21 the newly applied layer is free with respect to the sheet of material 16. Thereafter the raising cylinders 36 are lowered and the sheet of material 16 is moved along again. Alternatively, the raising cylinders 36 can raise the sheet of material 16 upward toward the processing unit 23 over the component 11. Thereafter the sheet of material 16 is moved along again and then the raising cylinders 36 are lowered.

The arrangement of the processing station 18 shown in FIG. 1 can likewise be arranged turned through 180°. The waster material can thereby automatically fall out by gravity from the laminar structure 14. In the embodiment shown in FIG. 1, a suction unit 38 is provided to suck up the waste material and removed it from the processing station 18.

After the waste material is eliminated, the cleaning device 39, in particular a cleaning roller or brush, can be guided over the last applied sheet of material 16 of the laminar structure 14 in order to clean the surface and if necessary also to remove any waste material present and to prepare for the next layer. Furthermore, so far as no further layer, such as for example adhesive or solder, is present on the sheet of material 16, also a burr due to the laser engraving can be smoothed by means of the cleaning roller 39. Likewise miscellaneous impurities, dust residues or the like can be removed which arise during processing of the sheet of material 16 by the laser beam 27 and the release of at leas tone adhesive layer applied to the layer of material 16. The cleaning device and suction unit or suction apparatus can also be provided in a unit. Thereby, with a one-time travel over the uppermost layer, both cleaning and the removal of the waste material are made possible.

In the processing station 18, at least one sensor is furthermore provided which determines the present component height of the green part produced up to now, in order for the elevating platform to be positioned exactly for the supplied sheet of material 16. At the same time, the monitoring and determination of the present constructional height can be used for adjustment of the laser focus in order to insert an exact cut gap in the uppermost sheet of material and in order not to impair the sheets of material located thereunder.

The device 12 shown in FIG. 1 and described in detail can for example also be used for the production of a component of paper, plastic material, wood or the like materials. The process parameters, particularly with regard to the power of the laser beam 27, are adapted to correspond to the selected materials. The apparatus 12 described in FIG. 1 is not provided absolutely for performing a first process section according to the invention. Advantageously this apparatus is used for this. Further apparatus, which make it possible to perform a first process step for construction of a laminar structure are likewise conceivable. Furthermore, this apparatus can be used independently of a second process step, insofar as the requirements that the sheets of material 16 stacked up for forming a laminar structure 14 are fixed to each other by adhesive or sticky bonding are sufficient for a specific application.

In FIGS. 2a-2g, plural sheets of material 16 are shown, which can be used, for example, for performing the method according to the invention.

In FIG. 2a, the sheet of material 16 has an adhesive layer 41, which is preferably arranged on an underside if the sheet if material 16. The adhesive layer 41 can likewise be arranged on the upper side of the sheet of material 16 and also on both sides of the sheet of material 16.

In FIG. 2b, a solder layer 42 is provided in addition to the adhesive layer 41. This solder layer 42 is arranged between the sheet of material 16 and the adhesive layer 41. Thereby the adhesive layer 41 can first form a bond to the adjacent sheet of material 16 with the production of the laminar structure 14. The solder layer 42 forms, when the second process section is performed, a material-bonded connection between the individual sheets of material 16. Alternatively, the combination of solder layer 42 and adhesive layer 41 can be provided on the upper side or both sides.

In FIG. 2c, an alternative to FIG. 2b for the embodiment of a sheet of material 16 is shown. The solder layer 42 and adhesive layer 41 are provided, respectively separated, on a side of the sheet of material.

In FIG. 2d, a further alternative arrangement is shown of adhesive layer 41 and solder layer 42 to the sheet of material 16. For example, an adhesive layer 41 and solder layer 42 are arranged on one side of the sheet of material 16, as against which only the solder layer 42 is arranged on the opposite side.

Alternatively to this, a construction according to FIG. 2e is shown, in which an adhesive layer 41 is provided on both sides of the sheet of material 16, and a solder layer 42 is provided on only one side of the sheet of material 16.

An embodiment is shown in FIG. 2f in which the adhesive layer 41 and solder layer 42 form a common layer. In this layer, the adhesive is bound into the solder layer, or the solder is bound into the adhesive layer. This embodiment can likewise also be provided only on the upper side or both sides of the sheet of material.

In FIG. 2g, a further alternative embodiment is shown. The layer 43 consists of a powder with a defined particle size, for example of steel or the like, an adhesive being provided in the interspaces. This embodiment makes it possible that a defined distance between the individual sheets of material 16 is already made possible when a green part is produced, and thus a laminar structure 14 in the processing station 18 of the apparatus 12.

Figure 3A:
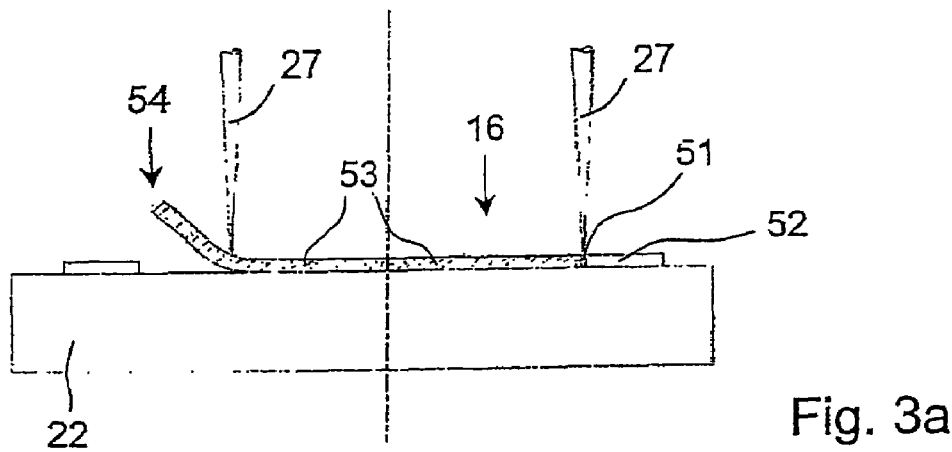
FIGS. 3a-3c show schematic diagrams for introduction of a contour and for performing a second process step.
Figure 3B:
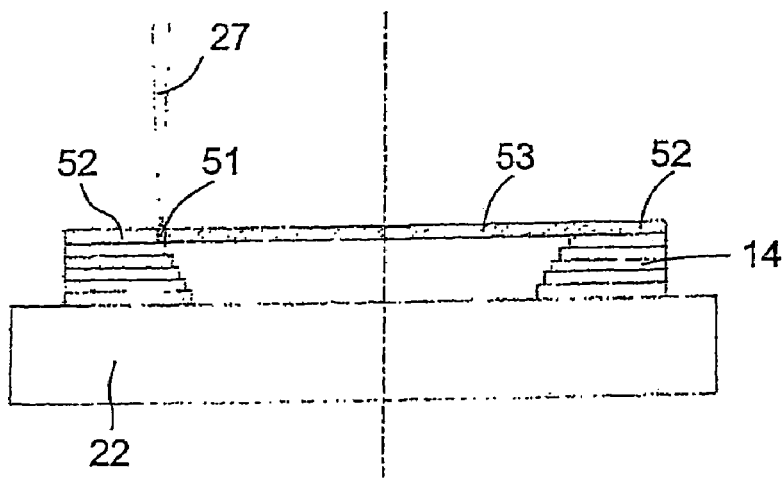
Figure 3C:
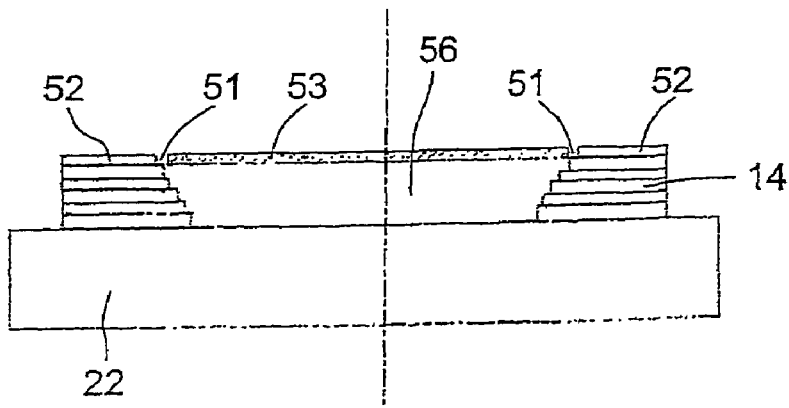

In FIGS. 3a-3c are shown individual work processes for producing a laminar structure 14 in a processing station 18.

In FIG. 3a, a first sheet of material 16 is applied to a baseplate 22 by adhesion. The sheet of material 16 is formed as a metal foil. In this embodiment it is provided that a cut gap 51 is introduced with the laser beam 27 in order to form a first contour for a component 11. Alternatively to laser engraving or sublimation cutting, cutting by means of an oxide chip is also suitable. After the introduction of the cut gap 51, the sheet of material 16 is divided into two with respect to the layers to be built up, and in fact into a construction layer 52 and also into waste material 53. The release of the waste material 53 and removal can take place by the suction unit 38. Preferably the adhesive action between the baseplate 22 and the waste material 53 is melted by scanning the surface of the material. The metallic foil is simultaneously heated by action of the laser beam 27 and a stress is introduced, which leads to at least one end 54 of the waste material 53 curling up and being removed by sucking away or sucking into a nozzle or vacuum plate or the like. Should the surface of the waste material 53 be too large for suction, it can be provided that this surface is comminuted into smaller surfaces by the laser beam, by introducing further cut gaps.

In FIG. 3b a work process is shown in which plural sheets of material 16 are already superposed. With a stack of material sheets 16 shown on the left-hand side, a cut gap 51 is introduced by the laser beam 27. Due to the geometry present, the cut gap 51 is located directly adjacent to an edge lying therebelow, so that at this place the waste material 53 abuts quasi linearly on the layer lying below it and in the layer located therebelow and thus can be directly taken off. On the right-hand side of the stack, the waster material 53 has a flat covering to the sheet of material located therebelow. In this region the covering it is required that the adhesives bonding is released by scanning with the laser beam 27.

In FIG. 3c, a further case during a work process is shown. The cut gap is located at the same height as the layer lying therebelow, or even further inward. In such a case, the waste material 53 falls into the interior or cavity 56 formed. Because of the very thin layers to be processed, the waste material 53 can be released only by means of the suction 38. To the extent that this cannot take place due to the thickness of the material or to damage to the last applied sheet, the waste material 53 is comminuted by an additional process. If necessary it can also be provided that the waste material 53 is already held by the suction devices 38 in order to prevent falling into the interior.

Figure 2:
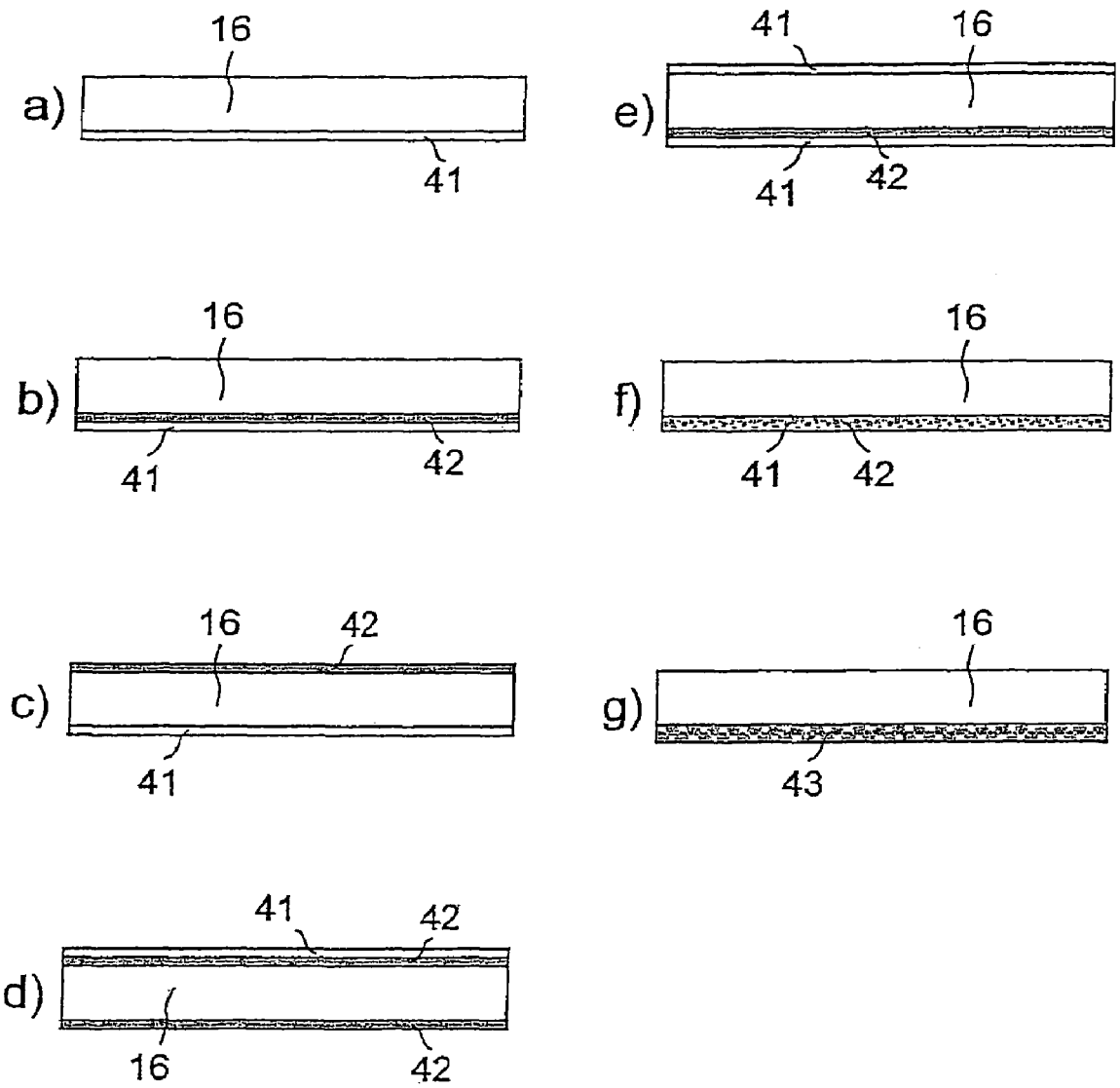
FIGS. 2a-2g show a schematic sectional diagram of the length of material provided for laminar construction, with different construction.

The performance of the work processes described in FIG. 3a-3c is not only possible for the sheet of material 16 described in FIG. 2 and its alternatives, but also for further material combinations.

The suction unit 38 can preferably also only be controlled or act with respect to individual regions, so that waste material 53 can be removed specifically in individual regions. The adhesive action of the adhesive between the sheets of material 16 can preferably be set with a sectional control of the suction unit 38 such that without ceasing the suction action, release by a laser beam 27 is given due to the suction action of the suction unit 38 for the waste material 53. Thereby the introduction of a contour by a laser beam 27 in the uppermost sheet of material 16 is sufficient, and the waste material 53 can be released by the subsequent suction process. The section-wise suction of the suction unit 38 can be controlled by means of the preparation of the CAD data, which also control the travel path of the laser.

In FIGS. 4a and 4b, the apparatus 13 for performing the second process step is shown in detail. The laminar structure 14 arranged on the baseplate 22 is inserted into a chamber 61. This chamber 61 has a floor 62 and a peripheral wall 63. The chamber 61 has a cover 64 with a stamp 67 bordering on an inner wall 66 of the peripheral wall 63. The laminar structure 14 is set in a powder bed in the chamber 61, or respectively the remaining free space in the chamber 61 is filled with a powder 68. This powder 68 is preferably neutral to the sheet of material used and also at least to an adhesive layer, solder layer or further layer which for example has a flux or weld additive. The powder bed is formed by a powder which cannot be soldered and sinters with difficulty, such as for example boron nitride or graphite. The powder 68 is compressed to a given degree in order to ensure the fixing of the layers to one another.

A bonding process takes place in the chamber 61, with the production of material bonding between the individual sheets of material. The chamber 61 is heated, in order to remove or expel the adhesive between the individual layers. Simultaneously a force is applied to the cover 64 in order to produce a uniform autogenous bonding between the individual sheets of material. During the expulsion of the adhesive, shrinkage of the component takes place with respect to constructional height, and the shrinkage of the component is compensated by the following of the stamp 67. The powder 68 surrounding the laminar structure simultaneously has the effect that the individual layers in the position stacked one above the other execute no movement relative to one another and thus retain their exact mutual positioning, although the adhesive bonding between the individual layers has been abolished due to the expulsion of the adhesive.

With the use of sheets of material 16 which have at least one solder layer, the solder is liquefied by a further elevation of the temperature in the heating-up phase, in order to initiate material bonding. The component cools down after the solder bonding, preferably with maintenance of the pressure, and is thereafter taken from the powder bed. The surfaces of the component 11 are then cleaned.

With the production of a laminar structure 14 with sheets of material which have only at least one adhesive layer or possibly additionally to the adhesive layer, a further layer for flux or weld additive, the temperature and pressure are increased such that welding, particularly diffusion welding, takes place between the layers.

With the production of a laminar structure 14 with a sheet of material 16 according to FIG. 2g, it is made possible that due to the metal powder layer 43, the distance between the two sheets of material 16 remains quasi constant and in the heating-up phase on the one hand the adhesive is expelled and with the provision of solder in the powder, because of capillary action a material bonding between the sheets of material 16 is produced by a solder layer. This embodiment has the advantage than an exact construction measurement in the Z-direction can already be attained in the production of the green part in the apparatus 12.

The heating process in the chamber 61 can take place under protective gas, inert gas, or in vacuum. The solder or diffusion welding process takes placed in a high temperature furnace.

Here it is conceivable to work according to the charging principle, that is, the chamber 61 is charged in the cold state into a furnace. The heating-up phase and the heating process then follow, and the crucible or the device 13 is removed gain in the cold state. Alternatively, a lock system can be provided, by means of which the crucible or the device 13 is introduced into a preheated furnace. The lock then acts to bridge over the temperature difference and to maintain the required furnace atmosphere, in order to perform the soldering or welding process. By means of this two-stage process, the cycle time for the bonding process can be reduced.

The production of a loadable component or prototype by means of the two-stage process according to the invention has the advantage that a component with a high accuracy can be produced using different materials, in particular high temperature resistant materials, and furthermore is free from internal stresses. By the pre-fixing with an adhesive for the production of a laminar structure 14, an exact production of the green part can be made possible. In the second process section, the geometry is maintained by the introduction of the laminar structure 14 into a powder bed, and all sheets of material 16 which form the laminar structure 14 are uniformly heated and uniformly subjected to pressure, in order to create a solder or weld bond between the individual sheets of material 16 for producing a material bond.

The embodiment according to the invention furthermore has the advantage that with the use of metallic foils as the sheets of metal, a completely metallic body is produced, which has high mechanical and thermal loadability. Likewise, the production of a ceramic body can result. Furthermore, the construction speed is very high, since in a first process section the applied layers are contoured, and in a second process section the applied layers are bonded with material. The production of plural bodies can thereby take place in parallel, and simultaneously high accuracy and also a multiplicity of components are made possible.

The invention claimed is:

1. Process for the production of a three-dimensional component (11) consisting of plural layers, in which in a first process section:
   - a sheet of material (16) coated at least one-sidedly with adhesive (26) is applied on a baseplate (22) or on a previously applied sheet of material (16) in a processing station (18), and
   - a contour is cut into an uppermost sheet of material (16), constituted by a construction layer (52) and a waste material (53), and the waste material (53) is removed, and in which in a second process section:
   - a laminate structure (14) is placed in a chamber and is surrounded, at least partially, by a powder (68),
   - the chamber (61) is heated in a heating-up phase to a temperature which is higher than a vaporization temperature of the adhesive provided between the individual sheets of material (16), and
   - an at least partial material bonding of materials is produced by a solder, weld, or sinter process between the individual sheets of material (16) of the whole laminar structure (14) by at least one heat treatment, and
   - wherein the powder (68) is composed of a powder mixture of at least a base powder and at least one additional powder and the additional powder is evaporated in the heating-up phase.

2. Process according to claim 1, wherein the chamber (61) is filled with a powder (68) which is neutral to the laminar structure (14), to the adhesive (26), to the solder, to the weld means or additives.

3. Process according to claim 1, wherein the laminar structure (14) is loaded with a pressure at right angles to the individual sheets of material (16) in the chamber (61).

4. Process according to claim 1, wherein a percentage volume fraction of the additional powder substantially corresponds to the percentage fraction of the adhesive applied between the individual sheets of material (16) of the laminar structure (14).

5. Process according to claim 4, wherein the chamber (61) is filled, at least in a region bordering on the laminar structure (14), with a powder mixture of at least a base powder and at least an additional powder.

6. Process according to claim 4, wherein as additional powder, hydrocarbon compounds are admixed, preferably polyolefins, polyacetates, polyacrylates.

7. Process according to claim 4, wherein as base powder a powder which cannot be soldered, cannot be welded, and can be sintered with difficulty is provided, preferably a boron nitride powder, corundum powder, or graphite powder.

8. Process according to claim 4, wherein a powder mixture is mixed of at least a base powder and at least one additional powder, with a particle size of respectively less than one millimeter.

9. Process according to claim 1, wherein the heating-up phase is ended at a temperature which is above the vaporization temperature of the adhesive, and that solder provided between the laminar structure (14) is converted into a flowable state.

10. Process according to claim 1, wherein the heating-up phase ends at a temperature located above the vaporization temperature of the adhesive, and wherein the sheets of material of the laminar structure (14) are material-bonded together by welding, particularly diffusion welding.

11. Process according to claim 1, wherein the laminar structure (14) is formed of sheets of material (16), which have at least on one side of the sheet of material (16) an adhesive layer (41) and at least one solder layer.

12. Process according to claim 1, wherein the laminar structure (14) results from sheets of material (16) which have at least on one side a layer which is composed of adhesive and solder.

13. Process according to claim 1, wherein the laminar structure (14) is formed of sheets of material (16), which have at least on one side a layer (43) which consists of a metallic powder with a predetermined particle size distribution and an adhesive.

14. Process according to claim 1, wherein a layer thickness of the sheet of material (16), preferably uncoated, fed to the processing station (18) is determined by a layer thickness measuring device (32).

15. Process according to claim 14, wherein the individual determined layer thicknesses of the supplied sheet of material (16) are added and are compared with geometric data in the Z-direction from a CAD model.

16. Process according to claim 1, wherein at least one adhesive layer (41) is applied by an application device (34) to at least one side of the sheet of material (16).

17. Process according to claim 1, wherein the actual height of the laminar structure (14) is sensed by a sensor arranged in the processing station (18) and preferably a focal position of a laser beam is adjusted for the placing of a cut gap (51).

18. Process according to claim 1, wherein at least one presser roller (37) is guided under pressure over the uppermost sheet of material (16) after the positioning of a new section of a sheet of material (16) on the laminar structure (14).

19. Process according to claim 1, wherein the regions of the waste material (53) are heated with laser by scanning, and at least the adhesion of an adhesive layer is reduced, in particular released.

20. Process according to claim 1, wherein the waste material (53) is sucked away by a suction unit (38) and is removed from the laminar structure (14).

21. Process according to claim 1, wherein at least the uppermost layer of the laminar structure (14) is cleaned by a cleaning apparatus (39), in particular by a cleaning roller or brush.

22. Process according to claim 1, wherein the removal of the waste material (53) and cleaning of the uppermost layer of the laminar structure (14) are performed in one work cycle.

23. Process according to claim 1, wherein the surface of the laminar structure (14) after contouring the constructional layer (52) and removing the waste material (53) is monitored by a sensor and the data are transmitted for monitoring a cleaning device (39).

24. Process according to claim 1, wherein a contour is introduced into the uppermost sheet of material (16) by laser engraving.

* * * * *